United States Patent [19]
Pollock

[11] Patent Number: 4,841,101
[45] Date of Patent: Jun. 20, 1989

[54] HERMETICALLY SEALED FEEDTHROUGHS AND METHODS OF MAKING SAME

[76] Inventor: John A. Pollock, c/o Product Engineering Associates Inc., P.O. Box 269, Wilton, N.H. 03086

[21] Appl. No.: 135,602

[22] Filed: Dec. 21, 1987

[51] Int. Cl.[4] ........................ H01B 17/30; B23K 3/02

[52] U.S. Cl. ............................ 174/152 GM; 228/168; 228/258; 403/30; 403/272

[58] Field of Search ......... 174/50.61, 50.63, 152 GM; 65/59.1, 59.3, 59.34, 59.35, 59.4, 59.6; 228/120, 121 R, 121 M, 122 R, 122 M, 124 R, 124 M, 168, 246, 249, 258; 403/28, 29, 30, 179, 272

[56] References Cited

U.S. PATENT DOCUMENTS 3,119,052 1/1964 Tsuji ........................ 174/152 GM X

FOREIGN PATENT DOCUMENTS 697420 9/1953 United Kingdom ....... 174/152 GM

OTHER PUBLICATIONS

Comer, J., "Applying Glass-to-Metal Seals", *Electrical Manufacturing*, vol. 2, No. 2, Aug. 1958, pp. 102–107.

*Primary Examiner*—Laramie E. Askin
*Attorney, Agent, or Firm*—Henry D. Pahl, Jr.

[57] ABSTRACT

In the sealed feedthrough construction disclosed herein, a maximally compliant solder joint is provided between the low expansion ferrule of a glass insulted feedthrough connector and a bore in an enclosure bulkhead of a high expansion metal. The desired uniform radial thickness is established by providing a step on either the outer diameter of the ferrule or the inner diameter of the bore.

12 Claims, 2 Drawing Sheets

HERMETICALLY SEALED FEEDTHROUGHS AND METHODS OF MAKING SAME

BACKGROUND OF THE INVENTION

The present invention relates to hermetically sealed electrical feedthroughs and more particularly feedthroughs for use in an enclosure constructed of a high expansion metal such as a minimum.

Hermetically sealed electrical feedthroughs are typically constructed by bonding a connector pin into a tubular ferrule or bushing using a glass-like insulating material, the ferrule being constructed of a metal such as KOVAR having a coefficient of expansion which approximates that of the glassy insulating material. The ferrule is then soldered into a bore in the enclosure bulkhead, each of the parts being previously plated to facilitate soldering. Typically, minimal clearance is provided between the ferrule and the bore in the enclosure wall in order to maintain concentricity which is important in many electrical applications, particularly those involving radio frequency (r.f.) energy. While such constructions have heretofore been reliably implemented where the enclosure is steel or other low expansion metal, extremely high rates of failure have been encountered when attempting to utilize the same constructional techniques in making feedthroughs through an aluminum wall member, owing to the very high coefficient expansion of aluminum.

The present invention is predicated in substantial part upon a perception that most seal failures in aluminum enclosures are due, not to failures of the glass insulating material but, rather, to failures of the solder joint between the ferrule and the material of the bulkhead within which the ferrule is soldered. Soldering a minimal clearance joint between the ferrule and the bulkhead results in a very thin layer of solder. While a thin layer of solder exhibits great strength in certain contexts and types of testing, it does not provide for any significant radial compliance in the context of the ferrule/-bulkhead joint described above. Accordingly, when the feedthrough is subjected to temperature cycling, as is required in the testing of many military components, the solder joint is fatigued and fails. This tendency to failure is apparently exacerbated by the well known tendency of solder to creep under stress. Not only is the clearance in general too small to provide adequate radial compliance, but the thickness of solder layer is typically nonuniform since no means is provided for centering the ferrule within the very small clearance of the bore. Thus, the ferrule will typically be somewhat eccentric, producing a solder thickness even thinner than the nominal radial clearance.

SUMMARY OF THE PRESENT INVENTION

In accordance with the practice of the present invention, a solder joint of substantial or maximally compliant thickness is formed between the ferrule of a feedthrough assembly and a bore in the enclosure bulkhead. The desired spacing for the solder joint is maintained by either a rim on the inner end of the ferrule or a step in the diameter of the bore at its inner end.

DESCRIPTION OF THE PREFERRED EMBODIMENTS

Figure 1:
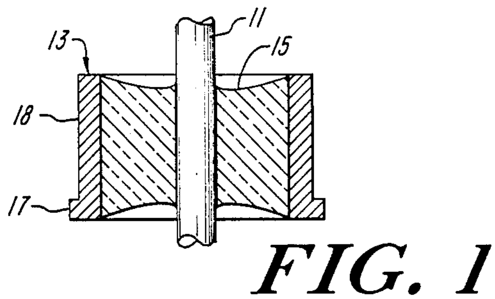
FIG. 1 is a side view, in section, of a feedthrough assembly useful in making a feedthrough connection in accordance with the present, invention.

Referring now to FIG. 1, a connector pin 11 is bonded into a generally tubular ferrule 13 using a glass-like insulating material 15 which is fused to both the pin 11 and the ferrule 13. The bonding techniques for forming the glass insulating annulus are well known and are not described in greater detail hereinafter. The ferrule 13 is constructed of a metal, typically KOVAR, having a coefficient of expansion which approximates that of the insulating glass 15. The nominal diameter of the ferrule will typically be in the order of 0.100 inch for r.f. (radio frequency) applications and in the order of 0.050–0.075 inch for d.c. and signal applications. Rather than having a uniform outer diameter, however, the ferrule 13 has, at its inner end, a rim 17 of increased diameter. Preferably, the height of the rim is in the order of 0.005 inch, this being a height which is substantially equal to the thickness of a maximally compliant solder joint as described in greater detail hereinafter. The remainder of the ferrule 13 is of uniform outer diameter, this portion being indicated by reference character 18.

Figure 2:
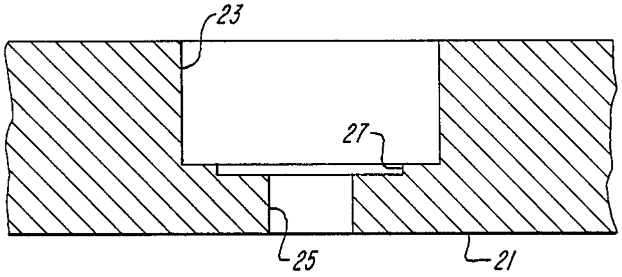
FIG. 2 is a sectional view of a bore in an enclosure bulkhead adapted for receiving the assembly of FIG. 1.

FIG. 2 illustrates an aluminum bulkhead or enclosure wall 21 which is bored to receive the feedthrough assembly of FIG. 1. In this embodiment, the ferrule 13 fits within a portion of the bore which is of uniform diameter, this portion being indicated by reference character 23. Typically, this portion does not pass all the way through the bulkhead 21 but, rather, there is a smaller diameter portion of the bore, designated by reference character 25, through which the connector pin extends. There may also be a short intermediate diameter portion 27 as is conventional. As is conventional, the aluminum bulkhead, or at least the bore surface 23, is plated so as to facilitate soldering thereto.

Figure 3:
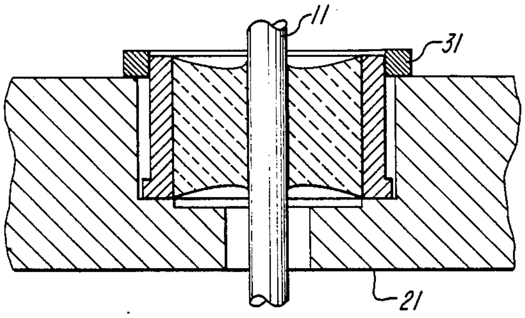
FIG. 3 is a sectional view showing the assembly of FIG. 1 inserted into the bore of FIG. 2, together with a solder preform ready for soldering.
Figure 4:
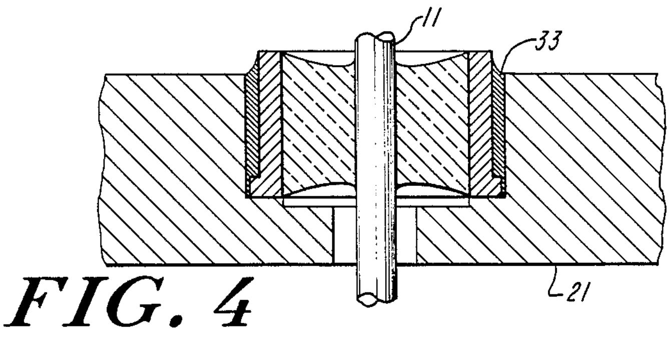
FIG. 4 is a sectional view of the completed feedthrough connection made in accordance with the present invention.

As may be seen in FIG. 3, the bore portion 23 receives the ferrule 13 with minimal clearance around the rim but with a substantial and well defined clearance around the remaining uniform diameter portion 18 of the ferrule. Clearance around the rim may, for example, be only 0.001 inch or less, i.e. only sufficient clearance to provide easy assembly, whereas the radial clearance between the remaining portion of the ferrule and the bore portion 23 is in the order of 0.005 inch.

A ring-like annular solder preform 31 is placed around the ferrule at the outer end of the gap between the ferrule and the bore portion 23. Upon heating, e.g. in a temperature controlled oven as is conventional in the art, the solder preform 31 melts and the solder is drawn, by capillary action, into the space between the ferrule and the bore portion 23. As is understood, most applications will require a multiplicity of feedthroughs and use of preforms and oven soldering allows the soldering of all of the feedthroughs to be completed in one process step.

In accordance with the understanding of the present invention, it has been found that a solder joint thickness in the order of 0.005 inch provides a practically maximally compliant solder joint. A thinner solder joint, e.g. less than 0.001 inch as was utilized by the prior art, does not have adequate radial compliance and will likely fail under thermal cycling. On the other hand, significantly thicker clearances between the main portion 18 of the ferrule 13 and the bore 23, e.g. 0.010 inch, will not provide a suitable capillary action for yielding a uniform filling of solder into the radial gap.

Figure 5:
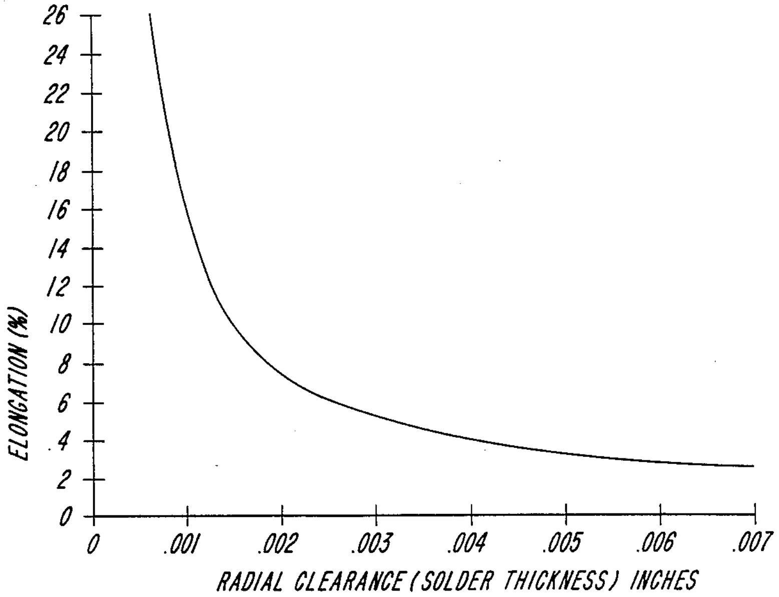
FIG. 5 is a graph representing a theoretical variation of solder joint radial elongation for changing solder joint thickness.

With reference to FIG. 5, there is illustrated a graph representing theoretical radial elongation of the solder joint versus radial thickness of the solder joint over a standard range of temperatures, i.e. minus 65 degrees C. to plus 125 degrees C., as called for by certain military test specifications. A nominal diameter for the ferrule of 0.100 inch is assumed. Below 0.001 inch radial clearance, the percent radial elongation rises rapidly. As indicated previously, such radial elongation will most likely cause failure of the solder joint in thermal cycling. In one sense, it may be understood that the thin solder joint does not have sufficient radial compliance to accommodate the differential expansion which occurs between the ferrule and the high expansion bulkhead. On the other hand, over a range of radial thickness from about 0.003 to 0.007 inch, the percent radial elongation has dropped to a relatively low level, i.e. about two to five percent. This is a level which can be tolerated by the solder joint without significant failure rates. As indicated previously, a significantly thicker solder joint (e.g. 0.010 inch) is disadvantageous as a practical matter since such a large gap will not provide suitable capillary action for yielding a uniform filling of solder into the radial gap. Thus, a solder joint thickness between 0.003 and 0.007, i.e. in the order of 0.005 inch, may be considered to provide a practically maximally compliant solder joint.

Figure 6:
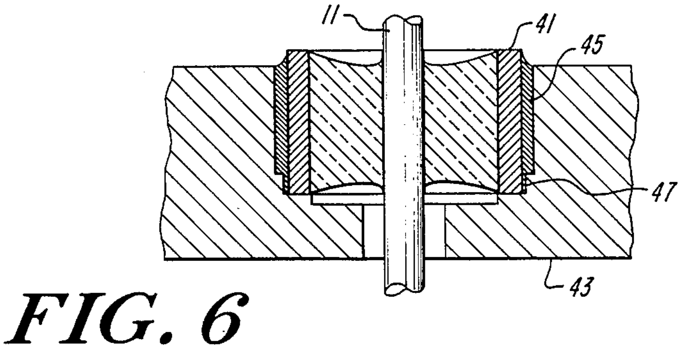
FIG. 6 is a sectional view of a completed feedthrough connection of an alternative embodiment of the invention.

As indicated previously, centering of the ferrule feedthrough assembly can be provided either by a rim on the ferrule or a shoulder in the bore in the high expansion bulkhead. FIG. 6 illustrates the alternative arrangement. With reference to FIG. 6, the feedthrough assembly illustrated there employs a ferrule 41 having an outer diameter which is constant. Ferrule 41 fits within a bore in an aluminum bulkhead 43, the major portion of the bore being of constant diameter providing a radial clearance of about 0.005 inch. This portion is indicated by reference character 45. At the inner end of the bore, however, there is a step providing a section of reduced diameter, designated by reference character 47. This reduced diameter portion provides minimum clearance of the outer diameter of the ferrule and thus centers the ferrule within the larger diameter portion 45 of the bore. Again, the radial clearance is preferably in the order of 0.005 inch so as to provide a practically maximally compliant solder joint.

Figure 7:
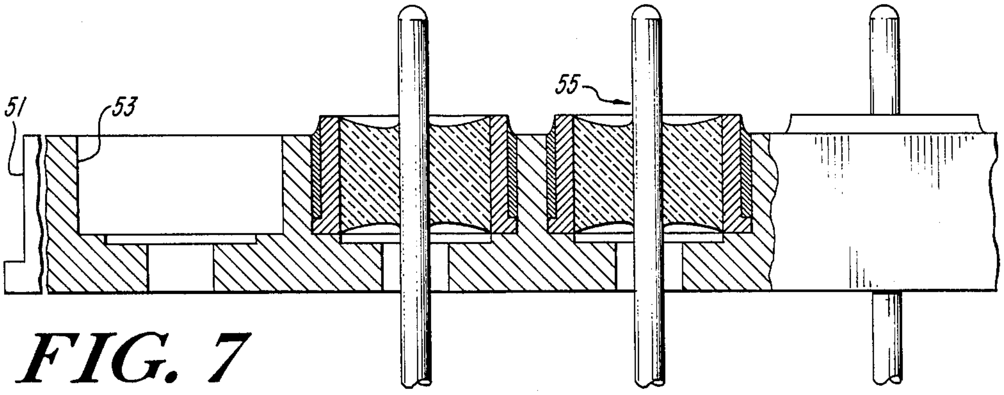
FIG. 7 is a sectional view of a multi-pin feedthrough connector constructed in accordance with the present invention.

Many applications, particularly coaxial connectors coupling microwave r.f. energy into or out of the enclosure, will require the feedthroughs to be individually positioned in the enclosure. In which case, the methods of construction just described are usable directly on the enclosure walls or bulkheads. In other applications, however, it may be appropriate to implement a multipin connector, e.g. for the introduction of control signals and power lines, etc. In such a case, an aluminum connector body may in effect constitute the bulkhead into which a multiplicity of feedthrough pins are inserted in accordance with the procedures described above. Such a construction is illustrated in FIG. 7. As may be seen, an aluminum connector body 51 is provided with a plurality of bores 53 for receiving feedthrough assemblies 55 of the type illustrated in FIG. 1. Again the rims on the ferrules of the feedthrough assemblies are sized to provide a solder joint thickness in the order of 0.005 inch. The aluminum connector body 51 may then be soldered in a corresponding opening in an aluminum enclosure without any particular difficulties, since the connector and the enclosure will have substantially matching coefficients of expansion.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. The method of making a hermetically sealed electrical feedthrough connection into an enclosure bulkhead of a high expansion metal, said method comprising:

bonding a connector pin into a tubular ferrule using a glass-like insulating material, said ferrule being constructed of a metal having a coefficient of expansion which approximates that of said insulating material, said ferrule being of substantially uniform outer diameter over most of its length but having, at its inner end, a shallow rim having a height which is substantially equal to the thickness of a maximally compliant solder joint;

boring a feedthrough port into an enclosure bulkhead of a high expansion metal, said port having a diameter over most of its length which will accept said rim with minimal clearance;

inserting said ferrule into said port rim end first with said rim centering the remaining length of the ferrule within the bore with essential uniform clearance; and introducing molten solder into said uniform clearance space thereby to provide a seal having radial compliance to accommodate differential expansion between said ferrule and said high expansion metal.

2. The method as set forth in claim 1 wherein the height of said rim is in the order of 0.005 inch.

3. The method as set forth in claim 1 wherein said substantially uniform outer diameter is in the order of 0.100 inch and the height of said rim is in the order of 0.005 inch.

4. The method as set forth in claim 3 wherein said high expansion metal is aluminum and said port is plated to facilitate soldering.

5. The method of making a hermetically sealed electrical feedthrough connection into an enclosure bulkhead of a high expansion metal, said method comprising:

bonding a connector pin into a tubular ferrule using a glass-like insulating material, said ferrule being constructed of a metal having a coefficient of expansion which approximates that of said insulating material, said ferrule being of substantially uniform outer diameter over its length;

boring a feedthrough port into an enclosure bulkhead of a high expansion metal, said port having a diameter over most of its length which will accept said ferrule with clearance which is substantially equal to the thickness of a maximally compliant solder joint and having, at the inner end of said port, a portion of reduced diameter which will receive one end of said ferrule with minimal clearance;

inserting said ferrule into said port with said portion of reduced diameter centering the remaining length of the ferrule within the bore with essential uniform clearance; and introducing molten solder into said uniform clearance space thereby to provide a seal having radial compliance to accommodate differential expansion between said ferrule and said high expansion metal.

6. The method as set forth in claim 5 wherein the reduction in diameter of the port at its inner end is in the order of 0.005 inch.

7. The method as set forth in claim 5 wherein the nominal diameter of said port is in the order of 0.100 inch and the reduction in diameter is in the order of 0.005 inch.

8. The method as set forth in claim 7 wherein said high expansion metal is aluminum and said port is plated to facilitate soldering.

9. In an enclosure bulkhead of a high expansion metal, a hermetically sealed electrical feedthrough connection comprising:

a tubular ferrule constructed of a metal having a coefficient of expansion which approximates that of glass, said ferrule being of substantially uniform outer diameter over most of its length but having, at its inner end, a shallow rim having a height which is substantially equal to the thickness of a maximally compliant solder joint;

a connector pin concentric within said ferrule;

a glass-like insulator bonded between said pin and said ferrule;

a feedthrough port in said enclosure bulkhead, said port having a diameter over most of its length which will accept said rim with minimal clearance, said ferrule being inserted into said port rim end first with said rim centering the remaining length of the ferrule within the bore with essential uniform clearance; and solder filling said uniform clearance space thereby to provide a seal having radial compliance to accommodate differential expansion between said ferrule and said high expansion metal.

10. The feedthrough connection as set forth in claim 9 wherein the height of said rim is in the order of 0.005 inch.

11. In an enclosure bulkhead of a high expansion metal, a hermetically sealed electrical feedthrough connection comprising:

a tubular ferrule constructed of a metal having a coefficient of expansion which approximates that of glass, said ferrule being of substantially uniform outer diameter over its length;

a connector pin concentric within said ferrule;

a glass-like insulator bonded between said pin and said ferrule;

a feedthrough port in said enclosure bulkhead, said port having a diameter over most of its length which will accept said ferrule with clearance which is substantially equal to the thickness of a maximally compliant solder joint and having, at the inner end of said port, a portion of reduced diameter which will receive said ferrule with minimal clearance, said ferrule being inserted into said port with said portion of reduced diameter centering the remaining length of the ferrule within the bore with essential uniform clearance; and solder filling said uniform clearance space thereby to provide a seal having radial compliance to accommodate differential expansion between said ferrule and said high expansion metal.

12. The feedthrough connection as set forth in claim 11 wherein the reduction in diameter of the port at its inner end is in the order of 0.005 inch.

* * * * *

UNITED STATES PATENT AND TRADEMARK OFFICE

CERTIFICATE OF CORRECTION

PATENT NO. : 4,841,101

DATED : June 20, 1989

INVENTOR(S) : John A. Pollock

It is certified that error appears in the above-identified patent and that said Letters Patent are hereby corrected as shown below:

In the "Abstract", line 3, "insulted" should be --insulated--.

Column 1, line 9, "a minimum" should be --aluminum--.

Signed and Sealed this

Seventeenth Day of April, 1990

*Attest:*

HARRY F. MANBECK, JR.

*Attesting Officer* *Commissioner of Patents and Trademarks*